United States Patent [19]
Stover

[11] 3,968,435
[45] July 6, 1976

[54] COMMUNICATION SYSTEM
[76] Inventor: Harris A. Stover, 10306 Mountington Court, Vienna, Va. 22180
[22] Filed: Feb. 6, 1975
[21] Appl. No.: 547,578

[52] U.S. Cl. ............................... 325/16; 179/82; 325/22; 325/305
[51] Int. Cl.² .......................................... H04B 5/02
[58] Field of Search .................. 179/82; 325/16, 17, 325/18, 19, 20, 21, 152, 305, 367

[56] References Cited
UNITED STATES PATENTS

| | | | |
|---|---|---|---|
| 2,249,425 | 7/1941 | Hansell | 325/305 X |
| 2,431,212 | 11/1947 | Varone | 325/20 |
| 2,899,547 | 8/1959 | Crow et al. | 179/82 X |
| 2,921,141 | 1/1960 | Enikeieff | 179/82 |
| 3,183,443 | 5/1965 | Lefevre | 325/16 X |
| 3,300,720 | 1/1967 | Kowols | 325/20 |
| 3,366,880 | 1/1968 | Driver | 325/22 |
| 3,474,451 | 10/1969 | Abel | 179/82 X |
| 3,601,550 | 8/1971 | Spracklen | 179/82 |
| 3,845,389 | 10/1974 | Phillips et al. | 325/16 |

Primary Examiner—Benedict V. Safourek
Attorney, Agent, or Firm—Hill, Gross, Simpson, Van Santen, Steadman, Chiara & Simpson

[57] ABSTRACT

An electronic short range communication system which allows communication between two or more parties who are fairly close to each other and which allows communication between parties having the communication equipment without interfering with those who do not have communication equipment. The equipment has a definite range limit so as to prevent undesirable interference with other similar systems located beyond a reasonable distance. This system also permits communication from the nearest units of the system so as to override communication originating from more remote units.

5 Claims, 11 Drawing Figures

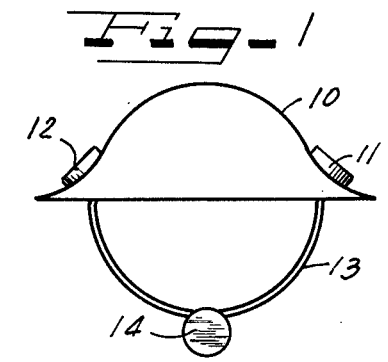
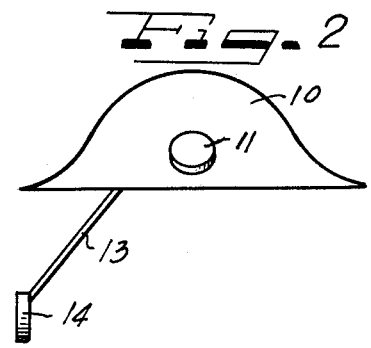
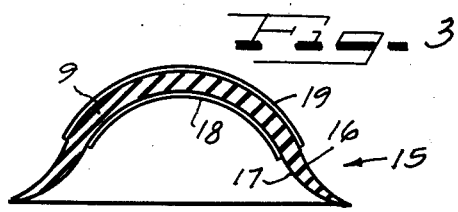
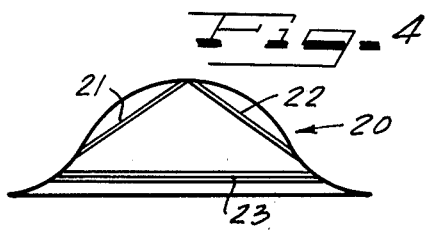
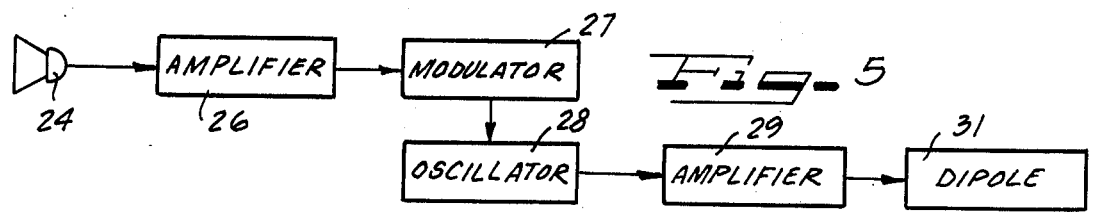
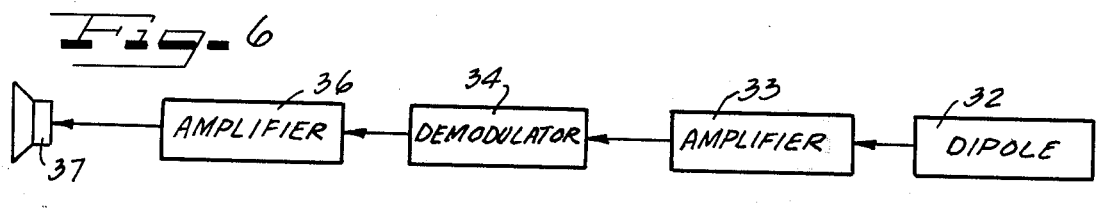
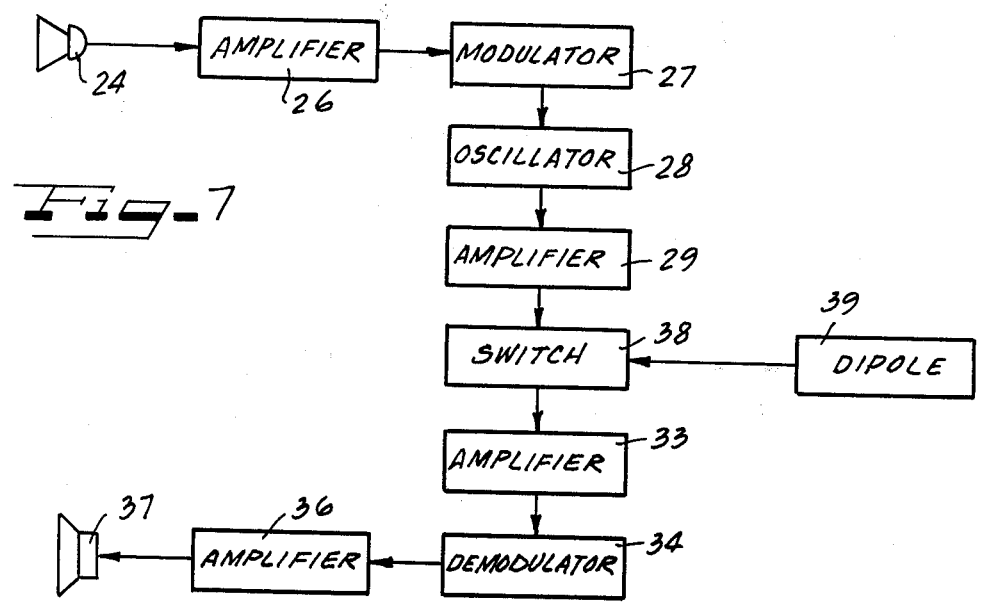

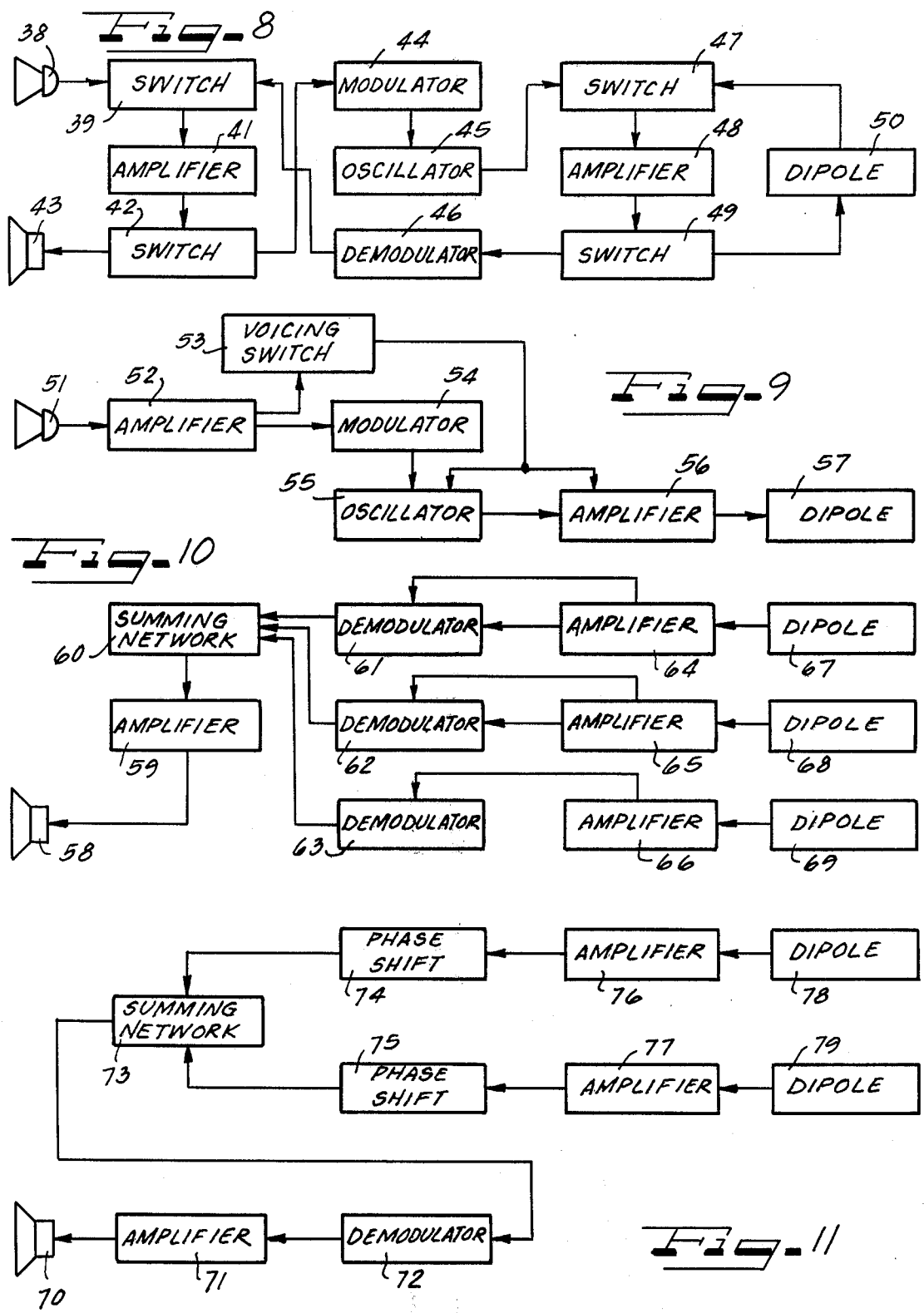

COMMUNICATION SYSTEM

BACKGROUND OF THE INVENTION

1. Field of the Invention

This invention relates in general to communication systems and in particular to a close range communication system.

2. Description of the Prior Art

Radio communication systems which allow person to person communication over relatively large distances are well known, however, there is a definite need for communication systems which are very compact and light and relatively inexpensive for use between people separated relatively short distances.

SUMMARY OF THE INVENTION

There are many different situations which could conveniently use a short range personal communication system. For example, in many situations where communication is presently by shouting or hand signals as for example, in various types of work crews which are within 100 feet of one another, it would be very convenient to provide an electronic short range personal communication system which would permit effective and simple communication utilizing a normal voice level and tone. For example, firemen engaged in fire fighting need a convenient substitute for the blow horn type loud speaker presently used by a fire chief for shouting directions to the firemen. A simple two-way communication system, for example, included in the firemen's helmet which would allow firemen inside burning buildings as well as those outside the building to communicate with those outside the building would be very desirable. Also, policemen could very effectively utilize communication systems according to the present invention as for example in controlling potential riot situations and continuous communication would be available between all of the involved police if equipped with an electronic short range communication system.

Another application of communication systems of the present invention exists in military combat wherein infantrymen who are presently required to expose themselves to enemy fire in order to communicate effectively with their nearest soldiers could use a short range communication system of the present invention.

The present invention comprises an electronic short range communication system which will extend the range of the normal speaking voice a couple of hundred feet or more and will also permit communication through the walls of buildings.

The present invention comprises an electronic communication system which permits voice communication among all persons equipped with the proper equipment while not affecting those persons who are not equipped with the communication equipment. The present invention provides communication within a definite range limit so as to prevent undesirable interference with other similar systems which are located beyond the desired range. The present invention also permits communications from nearby units of the system to override communication originating from more remote units. Although the communication from the nearest transmitter will take precedent over more remote transmitters when the near transmitter ceases radiation the distant transmitters can then be heard. This characteristic is the so-called sitting room characteristic and is analogous to a person listening to his nearest neighbor's conversation while the nearest neighbor is speaking but who can hear more remote speakers when the close neighbor ceases to speak. The present invention allows voice communication at normal voice levels and tones to be extended well beyond 200 to 300 feet.

The present communication system uses a headpiece or helmet upon which is mounted one or two small loudspeakers, one or more electric or magnetic loop dipoles, a microphone and the associated electronics interconnecting these units.

The transmitter and receiver units may operate at low frequencies, as for example, in the 20 kilohertz to 30 kilohertz range and the systems may be operated in the near field. The dividing point between the near field and the far field is generally taken as the point where the real energy field (power field or radiation field) approximately equals the quadrature energy field (inductive or capacitive field in which the energy remains in the vicinity of the dipole rather than being radiated.) The wavelength divided by two pi defines this dividing range between the near field and the far field. This range is approximately a mile at a frequency of 30 kilohertz and approximately a mile and a half for a frequency of 20 kilohertz. Thus, communication ranges of a couple of hundred feet are well within the near field. An important property of the near field is that the electric field strength of an electric dipole or the magnetic field strength of a magnetic dipole varies inversely as the cube of the distance from the dipole rather than inversely as the first power as in the far field. This contributes to two desirable characteristics of the system. It places a definite range limitation on the system and prevents undesirable interference with other similar systems that may be located beyond a reasonable distance. This is true because the system will normally be used with the radiation field reduced to negligible levels. The present invention also permits communication from nearby units to override communication originating in the more remote units because of the rapidly increasing field strength as the distance to the transmitting dipole is decreased. This characteristic can be considerably enhanced by the use of frequency (or phase) modulation. The frequency of the sum of more than one signal is determined predominantly by the strongest signal. This is commonly known as the f-m capture effect. The choice of frequency (or phase) modulation contributes another desirable characteristic. Although the signal will vary greatly with range, due to the inverse cube variation with distance, it is desirable to have the sound level from the loudspeaker be independent of the range. When the frequency ((or phase) modulation is used the loudness of the sound from the loudspeaker is dependent upon the modulation deviation rather than the signal strength. Thus, the system of the present invention employing the near field rather than the radiation field and which uses frequency (or phase) modulation has all of the desirable characteristics for a short range electronic communication system.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 illustrates the invention mounted on a helmet in a front view.

FIG. 2 is a side view of the helmet.

FIG. 3 is a sectional view of the helmet.

FIG. 4 illustrates in modified helmet.

FIG. 5 illustrates a transmitter of the invention.

FIG. 6 illustrates a receiver of the invention.

FIG. 7 illustrates a transceiver of the invention.

FIG. 8 illustrates a modification of the invention.

FIG. 9 illustrates a transmitter of the invention.

FIG. 10 illustrates a receiver of the invention, and

FIG. 11 illustrates a modified receiver of the invention.

DESCRIPTION OF THE PREFERRED EMBODIMENTS

FIGS. 1 and 2 illustrate a communication system of the invention including a helmet 10 which can be worn by a user and which has loud speakers 11 and 12 mounted so as to provide sound to the user's ear and which has a microphone holder 13 to which a microphone 14 is mounted. The earphones may be mounted relative to the user's ear so as to cover the ears or alternatively they may be arranged so that the user can hear normal conversation in his immediate environment while listening to messages through the communication system. The microphone 14 may also be detachable so that it can be hand held under certain conditions if desired.

FIG. 3 illustrates a helmet 15 with an inner layer 17 and an outer layer 16 upon which a pair of conductors 18 and 19 are arranged so as to form dipoles separated by insulation material 9.

FIG. 4 illustrates a helmet 20 which has a plurality of magnetic dipoles 21, 22 and 23 arranged in different orientations so as to assure reception of energy from any direction. The magnetic dipoles may consist of a number of turns of wire and changing current flow through the loop of wire sets up a dynamic field of the magnetic dipole.

In this invention either magnetic or electric dipoles may be utilized but all units within the system must utilize the same type of dipole. If it is desired to have two separate independent systems operating within the same area, with relative isolation between them, it may be desirable to provide one system with electric dipoles and the other system with magnetic dipoles.

The associated electronics for the transmitter and receiver are also mounted in the helmet and FIG. 5 is a block diagram of a suitable transmitter and FIG. 6 is a block diagram for a suitable receiver. In FIG. 5 the microphone 24 corresponds to the microphone 14 illustrated in FIGS. 1 and 2 and supplies an input to an amplifier 26. The amplified voice wave supplies an input to a modulator 27 which frequency (or phase) modulates an oscillator 28. The output of modulator 28 is supplied to an amplifier 29 which is connected to the radiating dipole 31. This system provides modulation of the output of the oscillator 28 with the voice signal from the microphone 24 which is radiated on the output of the oscillator by the dipole 31.

A receiving unit includes a dipole 32 which detects the signal radiated by the transmitter shown in FIG. 5 and supplies its output to an amplifier 33 which is connected to a demodulator 34 to produce the audio signal. An amplifier 36 receives the output of the demodulator 34 and supplies an output to a speaker 37 which represents the earphones 11 and 12. The amplifier 36 adjusts the output of the loudspeaker 37 to a desired sound level.

FIG. 7 illustrates a modification of the invention wherein a single dipole 39 is utilized for both transmitting and receiving function. The dipole 39 is connected to a switch 38 which connects it to the amplifier 29 to receive the modulated output of the oscillator 28 in transmit mode. The switch 38 can also disconnect the dipole 39 from the amplifier 29 and connect it to the amplifier 33 for receive mode wherein the output of the dipole 39 will be supplied to the amplifier 33 and to the demodulator 34 and through the amplifier 36 to the loudspeaker 37. Thus, in the system of FIG. 7 a single dipole is used which is switched to either the transmitter or receiver.

FIG. 8 illustrates a modification of the invention which allows the total number of amplifiers to be decreased by using four switches 39, 42, 47 and 49. In transmit mode the microphone 38 supplies an input to a switch 39 which is at that time connected to an input of an amplifier 41 which supplies an output to a switch 42 which in transmit mode supplies an output to a modulator 44 which modulates the oscillator 45. The output of the oscillator 45 is supplied to a switch 47 and in the transmit mode the switch 47 supplies an output to amplifier 48 which has its output connected to switch 49 which in the transmit mode supplies an output to the dipole 50.

In the receiving mode the energy is picked up by the dipole 50 and supplied to the switch 47 which at that time is in a condition such that it supplies its output to the amplifier 48 which supplies its output to the switch 49 which is in the condition that its output is supplied to the demodulator 46. The output of demodulator 46 is supplied to switch 39 which in the receive mode supplies its output to the amplifier 41. The output of amplifier 41 is supplied to the switch 42 which in the receive mode supplies its output to the speaker 43. It is to be realized that the switches 39, 42, 47 and 39 are simultaneously actuated to switch their conditions when change is made from the transmit to receive to transmit modes.

The systems of FIGS. 5, 7 and 8 do not illustrate on-off switching of the oscillator for transmit/receive function changes. However, it is generally desirable that the oscillator should be inactivated during the receive function because transmit and receive use the same frequencies and interference can occur from the oscillator during reception. The oscillator can be switched on or off manually as for example through a push to talk switch which could also actuate the switches 39, 42, 47 and 49 in FIG. 8 or the switch 38 in FIG. 7.

FIG. 9 illustrates a modification wherein a voice operated switch actuates the oscillator during transmit function. In FIG. 9 the microphone 51 supplies an output to an amplifier 52 which supplies a first output to a voice operated switch 53 and a second output to a modulator 54. The output of the modulator 54 is supplied to an oscillator 55 which supplies its output to an amplifier 56. The output of the amplifier 56 is supplied to the dipole 57. The output of the voice operated switch 53 is connected to the oscillator 55 and amplifier 56 to energize them when a voice signal is supplied by the amplifier 52 to the voice operated switch 53. If no voice signal is present at the output of the amplifier 52 the voice operated switch 53 de-energizes the oscillator 55 and amplifier 56.

One potential problem of the use of dipoles in electronic short range communication systems is that at certain orientations the field may be perpendicular to the dipole axis and if another dipole is displaced from the first dipole in this direction and with its axis parallel to the axis of the first dipole, the second dipole will not have any signal induced into it by the first dipole. In other words, the two dipoles will be uncoupled in certain relative orientations and there will be a null in the received signal under these conditions. If only single dipoles are used at the transmitter and receiver there will be locations and orientations between the dipoles which will produce a null. This problem can be solved by providing either receiving or transmitting portions of each unit of the system with three noncoplanar dipoles and suitable provision for coupling to them. Three noncoplanar dipoles cannot be in a null condition at the same time. FIG. 10 illustrates a receiver having three noncoplanar receiving dipoles for use with a transmitter such as illustrated in FIG. 9. At least one of the dipoles 67, 68 and 69 will always be oriented to pickup a signal from the dipole 57. The three noncoplanar dipoles 67, 68 and 69 are respectively connected to amplifiers 64, 65 and 66. The amplifiers 64, 65 and 66 supply outputs to the demodulators 61, 62 and 63. The amplifiers 64, 65 and 66 also supply second level outputs to the demodulators 61, 62 and 63 and since the output signal levels are detected within the amplifiers 64, 65 and 66 if the signal level becomes too low the associated demodulators 61, 62 and 63 are disabled. This prevents any noise that might be generated in the demodulator associated with a dipole that is in a signal null from reaching the summing network 60. The summing network 60 receives the outputs of the demodulator 61, 62 and 63 and combines the outputs into a single signal which is supplied to an amplifier 59 and then to a loudspeaker 58. The summing network 60 may be omitted in some systems and the outputs of the demodulators 61, 62 and 63 may be directly connected together and supplied to the amplifier 59.

FIG. 11 illustrates a modification of the invention where only a pair of noncoplanar dipoles 78 and 79 are utilized with the transmitter of FIG. 9. The output of the dipole 78 is connected to an amplifier 76 which supplies its output to a phase shifter 74 which provides an input to a summing network 73. The dipole 79 supplies an output to an amplifier 77 which supplies an input to a phase shifter 75 which has its output connected to the summing network 73. The use of two noncoplanar dipoles 78 and 79 is rendered feasible because it is quite remote that both of the dipoles 78 and 79 will be in orientations wherein both are in a null. The phase shift networks 74 and 75 shift the phase of the outputs of the amplifiers 76 and 77 so that they are 90° apart in phase. Once the signals have been given a phase which is 90° apart this assures that there will be no amplitude change or phase reversal that can cause the signals from the phase shifter 74 and 75 to cancel in the summing network 73. The output of the summing network 73 is supplied to the demodulator 72 which supplies its output to the amplifier 71 which is connected to the speaker 70.

In embodiments utilizing voice actuated switches such as in FIG. 9 it is important that such voice actuated switches are not energized when the equipment is in the receive mode by the microphone receiving sound from the loudspeakers. This problem can be solved by utilizing a pair of loudspeakers 11 and 12 such as shown in FIGS. 1 and 2 with the orientation as shown relative to the microphone 14 and wherein the loudspeakers 11 and 12 are driven in phase opposition. This will cause sound waves produced by them to cancel at the position of the microphone 14 since it is spaced equal distances from each of the loudspeakers. Thus, when the user speaks the microphone will actuate the voice operated switch but when the loudspeakers 11 and 12 are energized the microphone will not energize the voice actuated switch.

It is to be realized, of course, that the voice actuated switch can also deactivate the receiver during transmit function so as to prevent feedback from the loudspeaker to microphone thus, preventing sqeal.

FIG. 4 illustrates a transmitting dipole 23 comprising a horizontal loop providing a vertical magnetic dipole axis. One of the receiving dipoles 21 is mounted on the front of the helmet inclined about 45° from the horizontal and the other dipole 22 is mounted on the rear of the helmet about 45° from the horizontal with the two receiving dipole axis of the dipoles 21 and 22 being about 90° apart.

The present invention comprises an effective electronic short range communication system which has many desirable properties as well as the basic capability of extending the range of normal voice communication to a couple of hundred feet or more. It may also be used to communicate through the walls of a building and would find application by work crews, firemen, police, military, personnel, sportsmen and many others.

This invention can also be utilized in communication between persons in automobiles and others. For example, a small whip or metal plate from a dipole antenna could be insulatingly mounted from the body of the automobile and connected to the transmitter and receiver of this invention. Such equipment could be used for short range communication between vehicles as well as between parties in a vehicle and other parties outside the vehicle.

It is seen that this invention has been described with respect to preferred embodiments although it is not to be so limited as changes and modification may be made therein which are in the full intended scope as defined by the appended claims.

I claim as my invention:

1. A near field radiating energy integral receiver-transmitter communication system wherein said transmitter comprises a microphone, a first amplifier connected to the microphone, a modulator connected to said first amplifier, a low frequency oscillator connected to said modulator, a second amplifier connected to said oscillator, a radiating dipole connected to said second amplifier, said receiver comprising first and second receiving dipoles mounted noncoplanar relative to each other, a third amplifier connected to said first receiving dipole, a first demodulator connected to said third amplifier, a fourth amplifier connected to said second receiving dipole, a second demodulator connected to said fourth amplifier, a summing network connected to first and second demodulators, a fifth amplifier connected to said summing network, a loudspeaker connected to said fifth amplifier, a head gear, and said receiver, said transmitter and said radiating dipole and said first and second receiving dipoles mounted on said head gear, and said loudspeaker mounted near a user's ear and said microphone mounted near a user's mouth.

2. A near field radiant energy integral receiver-transmitter communication system according to claim 1 wherein said modulator frequency modulates said oscillator.

3. A near field radiant energy integral receiver-transmitter communication system according to claim 1 wherein said modulator phase modulates said oscillator.

4. A near field radiant energy communication system according to claim 1 including a third receiving dipole mounted noncoplanar with said first and second receiving dipoles on said head gear, a sixth amplifier connected to said third receiving dipole, a third demodulator connected to said sixth amplifier, and said third demodulator connected to said summing network.

5. A near field radiating energy integral receiver-transmitter communication system wherein said transmitter comprises a microphone, a first amplifier connected to the microphone, a modulator connected to said first amplifier, a low frequency oscillator connected to said modulator, a second amplifier connected to said oscillator, a radiating dipole connected to said second amplifier, said receiver comprising first and second receiving dipoles mounted noncoplanar relative to each other, a third amplifier connected to said first receiving dipole, a first phase shift means connected to said third amplifier, a fourth amplifier connected to said second receiving dipole, a second phase shift means connected to said fourth amplifier, a summing network connected to first and second phase shift means, a demodulator connected to said summing network, a fifth amplifier connected to said demodulator, a loudspeaker connected to said fifth amplifier, a head gear, and said receiver and transmitter and said radiating dipole and said first and second receiving dipoles mounted on said head gear, and said loudspeaker mounted near a user's ear and said microphone mounted near a user's mouth.

* * * * *